United States Patent Office 3,298,924
Patented Jan. 17, 1967

3,298,924
PROCESS FOR MAKING PENICILLIN AMIDASE
Thomas Ronald Carrington, Milestones, Amberly Drive, Goring-by-Sea, England; Thomas Adrian Savidge, 18 Hawthorn Road, Worthing, England; and Martin Francis Walmsley, Rose Cottage, Ferring St., Ferring, England
No Drawing. Filed Nov. 6, 1964, Ser. No. 409,594
Claims priority, application Great Britain, Nov. 7, 1963, 43,910/63
4 Claims. (Cl. 195—65)

The present invention relates to an improved process for the production of penicillin-splitting enzyme preparations.

In Patent No. 3,116,218 there is described and claimed a process for the production of penicillin-splitting enzyme preparations, characterized by cultivating, according to conventional methods, penicillin-splitting bacteria under aeration in nutrient solutions which contain almost insignificant quantities of fermentable carbohydrates and to which phenyl-acetic acid or derivatives thereof are added in quantities of 0.002–2%, based on the nutrient solution.

It is an object of the present invention to provide an improved process over that described in the said specification, whereby the penicillin-splitting capacity of the enzyme preparation is increased.

Accordingly, the present invention provides a process for the production of penicillin-splitting enzyme preparations, which process comprises cultivating penicillin-splitting bacteria under aerobic conditions in a nutrient medium substantially free from fermentable carbohydrate, and adding ammonium phenylacetate to the medium slowly during the course of the fermentation to a total final concentration of 0.12–2.0% w./v.

Preferably the penicillin-splitting bacteria are *Escherichia coli*.

The nutrient medium preferably contains corn steep liquor, but other nutrients may also be used, for example yeast extracts. The medium may contain additives of the type usually used, such as inorganic ions, vitamins and growth factors, many of which occur in corn steep liquor. The medium is intended to be substantially free from fermentable carbohydrate, although it is to be understood that small amounts may be introduced in the materials used.

Preferably the ammonium phenylacetate is added to a final concentration of 0.3–0.4% w./v. for optimum results, the additions being made to the medium at intervals during the fermentation.

In a preferred embodiment of the invention a batch of ammonium sulphate (0.1–1.0% w./v.) is added to the medium at the start of the fermentation, then the ammonium phenylacetate is added slowly. By this method preparations are obtained having a better penicillin-splitting capacity than when the ammonium sulphate is not added.

It has been established that, when the ammonium phenylacetate is added in one batch near the beginning of the fermentation, the capacity of the final enzyme preparation is only slightly improved. Also, when sodium or potassium phenylacetate is added in one batch near the beginning of the fermentation (a typical prior art procedure) followed by slow addition of aqueous ammonium hydroxide or ammonium sulphate during the course of the fermentation, the capacity of the final enzyme is not improved. These tests suggest that the ammonium phenylacetate when added slowly during the course of the fermentation does not act merely by correcting a deficiency of inorganic nitrogen in the medium.

The improved process has many advantages, for example there is a reduction in the number of fermentations necessary to produce preparations for a good splitting capacity. Such preparations are used to split penicillins, particularly penicillin G, in the preparation of 6-aminopenicillanic acid.

In comparison tests, the results were as follows:
(a) In each of two pairs of experimental fermentations, when batches of sodium and of ammonium phenylacetate were each added near the beginning of the fermentations, the yield with the ammonium salt was 12% greater than with the sodium salt.
(b) In a pair of experimental fermentations, when aqueous solutions of sodium, potassium and ammonium phenylacetates were added to the media slowly during the fermentations, the yield with the ammonium salt was 100% greater than with the sodium and with the potassium salts.
(c) In a pair of experimental fermentations, when sodium phenylacetate was added in one batch near the beginning of the fermentation and when aqueous ammonium phenylacetate was added during the fermentation, the yield with the ammonium salt was 84% greater than with the sodium salt. The following example illustrates the invention.

Example 590 l. of 2.25% w./v. corn steep liquor (equivalent to 13.3 kg.) was adjusted to pH 6.5 with sodium hydroxide and then sterilised at 121° C. for 30 minutes. The liquor was then inoculated with 3 l. of a vegetative seed culture of *E. coli*, and subsequently incubated at 24° C. with agitation and aeration. A solution of ammonium phenylacetate was prepared by treating 25% w./v. aqueous phenylacetic acid with concentrated aqueous ammonium hydroxide to pH 7 and then it was sterilised at 121° C. for 30 minutes. This ammonium phenylacetate solution was added to the medium 8 hours after the inoculation, and it was added at one hour intervals to 21 hours inclusively, each addition comprising 600 ml. of the solution. 22–28 hours after the inoculation the cells were harvested and the preparation was used for splitting penicillins.

We claim:
1. A process for the production of penicillin-splitting enzyme preparations, which process comprises cultivating penicillin-splitting bacteria under aerobic conditions in a nutrient medium substantially free from fermentable carbohydrate, and adding ammonium phenylacetate to the medium slowly during the course of the fermentation to a total final concentration of between 0.12 and 2.0% w./v.

2. A process according to claim 1, in which the penicillin-splitting bacteria are *Escherichia coli*.

3. A process for the production of penicillin-splitting enzyme preparations, which process comprises cultivating penicillin-splitting bacteria under aerobic conditions in a nutrient medium substantially free from fermentable carbohydrate, and adding ammonium phenylacetate to the medium slowly during the course of the fermentation to a total final concentration of between 0.3 and 0.4% w./v.

4. A process for the production of penicillin-splitting enzyme preparations, which process comprises cultivating penicillin-splitting bacteria under aerobic conditions in a nutrient medium substantially free from fermentable carbohydrate and adding a batch of between 0.1 and 1.0% w./v. of ammonium sulphate, and adding ammonium phenylacetate to the medium slowly during the course of the fermentation to a total final concentration of 0.12–2.0% w./v.

No references cited.

A. LOUIS MONACELL, *Primary Examiner.*
L. M. SHAPIRO, *Assistant Examiner.*